3,108,976
PREPARATION OF A CURED POLYURETHANE
CELLULAR MATERIAL
Roger E. Knox, Brandywine Hundred, Del., assignor to
E. I. du Pont de Nemours and Company, Wilmington,
Del., a corporation of Delaware
No Drawing. Filed June 10, 1960, Ser. No. 35,145
13 Claims. (Cl. 260—2.5)

This invention relates to a novel process for preparing organic cellular materials.

Organic cellular materials, such as polyurethane foams, are becoming an increasingly valuable article of commerce. In order to broaden their public acceptance still further, it would be highly desirable to find new and improved ways to prepare them.

It is an object of the present invention to provide a novel process for preparing cured organic cellular materials from organic liquid foam precursors. A further object is to provide a novel process for preparing polyurethane foams. A still further object is to provide a process for preparing cured organic cellular materials wherein air is utilized as the blowing agent. Other objects will appear hereinafter.

These and other objects of this invention are accomplished by a process for preparing a cured organic cellular material which comprises passing an organic liquid and an inert gas together through a frothing zone consisting essentially of at least one perforated plate having a plurality of openings whose number-average size is such that the average minor axis of any opening is not less than 10 microns and the average major axis of any opening is not greater than 2000 microns, thereby causing at least a portion of said organic liquid and inert gas to form a froth consisting essentially of a plurality of bubbles having a number-average particle size ranging from about one to 2000 microns; reducing the pressure over said froth to less than the pressure at which it was formed, thereby causing expansion of said froth; and curing said expanded froth to yield a cured, tack-free organic cellular material; said organic liquid being a precursor for said cured cellular material and having a Brookfield viscosity at the temperature at which said froth is formed of below about 20,000 centipoises; the ratio in cu. ft./lb. of said inert gas to said organic liquid as they enter said frothing zone having a value ranging from about 30:1 to 120:1; with the proviso that when more than one perforated plate is employed, the number-average distance between the adjacent surfaces of said plates shall be such that the ratio of the distance between said adjacent surfaces to the total area of one of said surfaces has a value greater than about 0.014.

As noted from the above definition, the present invention is concerned with a process for preparing a cured organic cellular material by frothing an organic liquid foam precursor with an inert gas, expanding this froth by reducing the pressure followed by the step of curing the expanded froth to obtain a cured tack-free cellular material. This process may be operated either as a batch or as a continuous process. The heart of this invention resides in the way that expandable bubbles of an inert gas are introduced into an organic liquid foam precursor.

Any organic liquid may be used in the process of the present invention which, at the operating temperature of the process, i.e. the temperature at which it is passed through the perforated plate or plates, has a Brookfield viscosity below about 20,000 centipoises. The term "liquid" as used throughout the present specification and claims, includes those materials having viscosities below the 20,000 centipoise figure at the operating temperature. More viscous liquids are less convenient to use in that it is more difficult to pass them through the perforated plate.

For purposes of the present invention, it is preferred to employ liquids having Brookfield viscosities at the operating temperature of from about 500 to 2000 centipoises. Another requirement as to the organic liquid employed is that it be capable of forming a cured tack-free cellular material. The term "precursor" in the present specification and claims indicates that a froth and a cured, tack-free cellular material can be obtained from the organic liquid. The various types of organic liquids which may be employed in the process of this invention will be more particularly described hereinafter.

The inert gas which is used in the process of the present invention will normally be air; however, it is to be understood that other gases or mixtures of gases may be employed. Other gases include nitrogen, carbon dioxide, helium, argon, xenon, krypton, neon and methane. The term "inert" means that the gas is essentially unreactive under the process conditions of this invention with itself or any other materials used to make or cure the organic cellular material. Liquids or mixtures of liquids may be employed which are gaseous at the operating temperatures of the process. Representative liquids include trichloromonofluoromethane, trichlorotrifluoroethane, dichlorohexafluoropropane, monochloroheptafluorocyclobutane, dichlorodifluoroethylene and 2,3-dichloro-1,1,3,3-tetrafluoropropene-1. It is to be understood that mixtures of the above-mentioned gases and liquids may be used if desired.

In carrying out the process of this invention, the organic liquid foam precursor and inert gas are passed together through a frothing zone consisting essentially of at least one perforated plate. By "perforated" is meant that a plurality of openings extend through these plates. These openings have a number-average size such that the average minor axis of the cross-section of any opening is not less than 10 microns and the average major axis of the cross-section of any opening is not greater than 2000 microns. The cross-section is perpendicular to the direction of gas flow. The preferred size for these openings ranges from 50 to 600 microns. The shape of these openings is not critical in that they may be circles, squares, rectangles, triangles, etc. It is to be understood that with some shapes, e.g. circle and square, the major and minor axis will be identical. Thus, with a circle the major and minor axis will conform to the diameter of the circle. More than one of these perforated plates may be employed. It is to be understood that when more than one perforated plate is employed neither the size of the openings in the plates nor the total cross-sectional areas of the plates need necessarily be the same. Similarly, the size of the openings in any one of the perforated plates need not all be the same. As the organic liquid and inert gas pass together through the openings in the perforated plate, a froth is obtained which consists essentially of a plurality of bubbles having a particle size ranging from about one to 2000 microns. Although upward passage of the inert gas and organic liquid through the perforated plate is preferred, it is to be understood that these materials may be passed downward, horizontally or at any angle through the plate. Unlike conventional frothing techniques, such as beating, the present process permits control of the bubble size of the froth very easily in that the smaller the openings in the perforated plate, the smaller the average bubble diameter in the froth. Furthermore, the present process permits the obtaining of a froth having on the average smaller bubbles than can be obtained by other techniques. It is believed that the reason for this result is that the dispersion of the inert gas into the organic liquid by passage through the perforated plate occurs in a non-equilibrium manner. In contrast to this, when conventional techniques, such as mechanical dispersion, are employed, an equilibrium point is reached where bubbles smaller than a certain size are being destroyed by the work of the dispersion as fast as they are being created. Another advantage of the non-equilibrium technique of this invention is that no noticeable heat build-up occurs while the froth is being formed. In contrast to this, conventional techniques, such as beater and pump dispersion, generate heat which may cause the bubbles to collapse.

The inert gas and organic liquid may be passed through the perforated plate at superatmospheric, atmospheric or even subatmospheric pressure. Superatmospheric pressure is preferred since the froth obtained can be expanded conveniently by subjecting it to atmospheric pressure. The temperature employed while forming the froth can range from about −100° C. to about 300° C. with a temperature of from about 20 to 150° C. being preferred.

The ratio, in cu. ft./lb., of inert gas to organic liquid which is passed into the frothing zone and through the perforated plate should range from 30:1 to about 120:1. When the value is below about 30, the process is not attractive since the froth obtained is too dense for many uses since so little gas is incorporated into the organic liquid. Selection of the preferred value will, of course, be determined by the desired density of the resulting organic cellular material and will depend on the viscosity of the organic liquid at the operating temperature. At a constant pressure, the higher the viscosity of the organic liquid, the greater the proportion of inert gas needed for frothing.

The perforated plate should be thick enough to exhibit mechanical rigidity under operating conditions. The materials of construction are chosen so that the perforated plate is inert to both the gas and organic liquid foam precursor passing therethrough. Representative examples of a perforated plate are a fine mesh screen or a perforated disc. The shape of the plate is not critical; however, flat plates are preferred. A preferred method of operation for obtaining the froth may be conveniently carried out at atmospheric or superatmospheric pressure in a cylindrical column having at least one perforated plate positioned therein. The inert gas and organic liquid pass upwardly through the column; thus, they are admitted to the cylindrical column below the porous plate and the froth is collected above this plate. In a preferred procedure, a series of perforated plates is employed, and in this instance it is convenient to admit the inert gas and organic liquid at the base of the cylindrical column and to take off the froth at or near the top of the column. If desired, a plurality of inlet and outlet ports can be arranged in the column in which case froth can be taken off at various points between the perforated plates.

When two or more perforated plates are employed, the separation of the adjacent surfaces of any pair of plates shall be such that the ratio (1/unit length) of the number-average distance between said adjacent surfaces of said plates to the total area of one of said surfaces shall have a value greater than about 0.014. (This area is defined by the periphery of the plate and thus includes the area across the opening of every perforation.) For example, a porous disc of circumference C, will have a surface area of $$\frac{C^2}{4\pi}$$

for the calculation of this ratio. When the surfaces are too close together, froth formation is impeded and when the surfaces are too far apart, the frothing zone has to be inconveniently long. When a cylindrical column is employed as the frothing zone, the spacing requirements between adjacent perforated surfaces of any pair of plates can be expressed as an $L/D$ ratio where L is the distance between the surfaces and D is their diameter. The $L/D$ ratio should be at least about 0.1 and preferably its value is below 10.

The dimensions of the frothing zone are not critical. When more than one perforated plate is employed, the zone must be long enough to permit the proper spacing between these plates. Very often the value of the ratio of the length of the zone to its cross-sectional area will be greater than one; however, it may be less than one if the perforated plate spacing permits. In representative cylindrical columns which have been used, the value of the ratio of the length of the zone to its cross-sectional area has ranged between about 7 and 17.

When using a cylindrical column as the frothing zone, it may be desirable to employ a plurality of rotatable conical screens. As the froth and any excess inert gas pass through these screens and leave the cylindrical column at the top, any entrained liquid is permitted to drain down the upper side of these screens to the walls of the column and flow down the walls of the column to the base for reuse.

As mentioned above, the froth which is obtained from the inert gas and organic liquid consists essentially of a plurality of bubbles having a number-average particle size of from about one to 2000 microns. The number-average bubble size is controlled by the size of the openings of the perforated plate (e.g. screen mesh size). The larger the openings, the larger the average bubble. Other factors being constant, the number-average bubble size appears to be independent of the value of the ratio of the inert gas to organic liquid and both the number and spacing of the perforated plates.

When frothing occurs at superatmospheric pressure, the bubbles can have diameters much smaller than the plate openings. For example, when a polyether polyol was mixed with air at 50 p.s.i. (gauge) in a column having 30-mesh screens (590 micron openings), the expanded froth emerging at atmospheric pressure had an average bubble size of only 70 microns.

The bubble count for a given cross-sectional area of froth depends on many factors. Other conditions being held constant, the bubble count increases as the value of the ratio of the inert gas to the organic liquid increases, as the viscosity of the organic liquid decreases, as the number of perforated plates increases and as their spacing or pore size decreases. In representative experiments the following data were obtained: the bubble count increased about 250 percent when the flow rate of inert gas was increased about 300 percent or when the viscosity of the organic liquid decreased about 45 percent; the bubble count increased about 350 percent when screens having 150-micron openings were substituted for screens having 300-micron openings.

Although the bubble size is a function of the size of the openings of the perforated plate, the density is a function of the proportion of organic liquid entrained. The froth density may be decreased by separating any entrained organic liquid; however, the bubble size remains constant. Froth density tends to decrease as the bubble count rises; thus decreased density results as the value of the inert gas to organic liquid ratio increases, as the viscosity of the organic liquid decreases, as the number of perforated plates increases and as their spacing or pore size decreases. It also decreases when the froth is subjected to any pressure drop or temperature increase after its formation and prior to or during the cure; such a pressure drop can occur in part in the frothing zone itself.

In a representative embodiment of the present invention, a 52-inch high polymethylmethacrylate column was used having an inner diameter of 2 inches; spaced therein at 2-inch intervals were 24 screens each having 300-micron openings (distance/area ratio= $2/\pi$; $L/D$ ratio= 1.0). Streams of air and polypropyleneether glycol (M.W. 2000) separately entered the base of the column at relative rates such that the value of the gas/liquid ratio (cu. ft./lb.) was 60. When the operation of this column at 25° C. at atmospheric pressure was interrupted by stopping the gas-liquid feed, it was observed that a layer of unfrothed liquid existed directly above each screen; froth filled the remainder of the space between this liquid and the screen above. The liquid level of each higher screen tended to be less than on the screen below. For example, the bottom screen liquid level was about 0.64 inch deep; the top screen liquid level was about 0.50 inch deep. The depth of froth had increased about 0.3 percent for each screen.

After the organic liquid and inert gas have formed a froth consisting essentially of a plurality of bubbles, the froth is expanded to form an organic cellular material by subjecting it to reduced pressure. The pressure change can occur in the frothing chamber itself, particularly when a batch process is employed; however, in general, the pressure change takes place elsewhere in that the froth passes from the frothing chamber to one or more other zones where a lower pressure already exists or is subsequently established. It is generally most convenient to carry out the frothing process at superatmospheric pressure and the froth thereby obtained is released into a zone at atmospheric pressure. When desired, frothing may be accomplished at superatmospheric pressure, atmospheric pressure or subatmospheric pressure and the resulting froth expanded under vacuum. Expansion of the froth usually occurs in somewhat of an adiabatic manner. The resulting temperature drop produces a desirable viscosity increase which tends to increase froth stability by lessening cell drainage.

The degree of expansion of the froth will depend on the reduction of pressure over the froth and expansion of the gas contained therein. Those skilled in the art can readily determine empirically the effect of changing pressure on the degree of expansion of the froth. Other factors being held constant, the greater the pressure difference the froth undergoes during expansion, the lower will be the density of the resulting cellular material. This is illustrated by the following data wherein frothing was accomplished at various pressures and expanded at atmospheric pressure.

| Frothing zone pressure (lb./sq. in., gauge): | Foam density (lb./cu. ft.) |
|---|---|
| 0 | 48 |
| 30 | 42 |
| 50 | 36 |
| 75 | 27 |
| 120 | 14 |
| 200 | 4 to 5 |

Various ingredients, such as compounding and curing agents, may be incorporated with the expanded froth. The expanded froth is relatively stable; however, the ultimate stability will depend in part on whether or not the froth is self-curing and, if not, how long it is allowed to stand before curing. Expanded froths which are not self-curing have been observed to remain unchanged after a day at about 25° C. In fact, it was determined that such froths could be reversibly expanded and contracted as often as desired by varying the pressure. It is to be understood, however, that froths which are not self-curing are not indefinitely stable. The expanded froths which are self-curing tend to become increasingly viscous with time. Foam collapse is not a problem after the cell network has acquired sufficient rigidity to resist plastic flow. In general, the expanded froths which are produced by the present invention can be cured to yield a tack-free cellular material quickly enough to obviate the danger of any foam collapse.

After expansion of the froth, it is necessary to cure the same in order to obtain a tack-free cellular material. Depending on the particular organic liquid employed in the formation of the froth, it will be apparent to those skilled in the art that various processing additives and curing agents may be added. The curing agents used will depend upon the nature of the material being cured. Thus amines or amine-terminated polymers will be particularly suitable for epoxy compounds. Polyisocyanates will be useful for curing hydroxyl-terminated polymers such as polyester polyols and polyalkyleneether glycols. Agents containing a plurality of active hydrogen groups (that is, containing groups such as amido, amino, carbamyl, hydroxyl, imido, imino, mercapto, sulfino, sulfo, sulfonamido, thiocarbamyl, ureido and urethaneo) can be used with isocyanato-terminated polymers. When organic liquids containing curable ethylenic unsaturation are used, curing agents such as sulfur and dicumyl peroxide can be employed. In the instance where the froth has been obtained from an organic liquid which is itself-curing composition (such as mixtures of a polyisocyanate and a polyol, mixtures of an ethylenically unsaturated polyester and a tertiary organic peroxide, mixtures of an epoxy resin and a polyamine, etc.) the expanded froth may be allowed to stand at ambient temperatures until cured. Often the cure time needed for such a system is shortened for convenience by the application of heat. In the instance of an expanded froth which cannot cure by itself (such as where the organic liquid is a polyalkyleneether glycol or an epoxy resin), it is necessary to incorporate additional reactants such as chain-extending and cross-linking agents into the expanded froth. The curable system thereby obtained may then be allowed to stand until the cellular material has become tack-free or it may be heated to accelerate the cure. The chain-extending or cross-linking agents are incorporated as liquids or gases into the expanded froth. Solutions of solids in inert liquids can be added when desired. It is possible to incorporate them with the froth as it comes from the chamber prior to expansion. Ionizing radiation can be used to cure the expanded froth.

In carrying out the process of the present invention, it may be desirable to employ a stabilizing agent. This agent may be present with the organic liquid and inert gas in the frothing zone or it may be added to the froth prior to curing. In the instance where a froth is obtained which self cures very exothermally, it is essential to include a cell stabilizer to avoid foam collapse. The heat evolved during curing decreases the cell wall viscosity which in turn lessens the stability of the foam. The cell stabilizing agents used may be selected within the skill of the art from the usual surface-active agents which are employed in the foam technology field. Suitable agents include the organosilicone block polymers of Examples 1A and 1C of U.S. Patent 2,834,748. These block polymers are particularly useful when the organic liquid is a mixture of a polymeric polyol and an organic polyisocyanate. A polydimethylsiloxane of about 50 centistokes viscosity is another useful cell stabilizing agent, particularly with a froth which, during cure, liberates only a moderate amount of heat. The proportion of cell stabilizer to be used can be readily determined by those skilled in the art. The amount frequently ranges from about 0.05 to about 1.0 percent by weight of the froth.

The organic liquids which are utilized in the process of the present invention may be selected from a wide variety of materials. As noted above, these liquids must have a specified viscosity at the operating temperature and they must be capable of being cured so as to yield tack-free cellular materials. For this reason, these liquids have been defined as being precursors for a cured cellular material.

Representative examples of self-curable organic liquid compositions which may be used in the process of this invention include mixtures of amines and epoxide-terminated polyalkyleneether polyurethanes (U.S. Patent 2,830,038); mixtures of a polytetramethyleneether glycol and 1,3 - bis(3 - isocyanato - p-tolyl)urea (U.S. Patent 2,858,298); mixtures of polyurethane diamines and epoxy resins (U.S. Patent 2,888,439); mixtures of polyester polyols and polyisocyanates (Bayer et al. in "Rubber Chemistry and Technology," vol. 23, pp. 812–835); mixtures of polyester polyurethanes and N,N'-β-dihydroxyethyl urea (U.S. Patent 2,822,349); mixtures of polyisocyanate-modified polyesters and glycols (U.S. Patent 2,729,618); mixtures of polyisocyanate-modified polyesters and diamines or aminoalcohols (U.S. Patent 2,620,516); mixtures of isocyanato-terminated polyalkyleneether polyurethanes and aliphatic polyols (British Patent 733,624); mixtures of isocyanato-terminated polyalkyletherthioether glycols and diamines or diols (U.S. Patent 2,917,489); mixtures of isocyanato-terminated polyalkyleneether polyurethane compounds, an acid-reacting substance or an organic compound containing a plurality of active hydrogen atoms (British Patent 796,044); isocyanato-terminated polyester polyurethanes with polyols or polyamines (U.S. Patent 2,621,166); isocyanato-modified polyether acetals with fatty acid esters containing at least 2 alcoholic hydroxyl groups (German Patent 1,045,095) and the self-curable isocyanato compositions of U.S. 2,889,883.

Organic liquid compositions, which are not self-curable and which may be used in the present invention, are the solutions of polyisocyanate compositions in inert solvents; polytetramethyleneether polyurethanes (U.S. Patent 2,901,467); polyester polyurethanes (French Patent 1,201,535; Australian application 20,059/53); isocyanato-terminated fatty acid triglycerides (U.S. Patent 2,787,601); isocyanato-terminated castor oil-epoxy resin condensation products (U.S. Patent 2,788,335); isocyanato-terminated polysulfides (U.S. Patent 2,814,600); isocyanato-terminated fatty acid triglyceride-polyol mixtures (U.S. Patent 2,833,730); isocyanato-terminated polyether-polyol mixtures (U.S. Patent 2,850,461); and isocyanato-terminated polytetramethyleneether polyurethanes (U.S. Patent 2,901,445; British Patent 797,965).

In the instance where the organic liquid contains terminal isocyanto groups, the froth which is obtained may be cured by adding thereto organic compounds having a plurality of alcoholic hydroxyl groups or amino groups. In particular, these curing agents may be defined as being low molecular weight organic polyols or organic diamines. At least about 0.5 mole of organic diamine should be employed for every mole of free isocyanato group in the isocyanato-terminated organic liquid composition. Arylene diamines are preferred; however, aliphatic diamines may be used under certain circumstances. It is to be understood that the term "arylene diamines" means those compounds in which each of the two amino groups is attached directly to an aromatic ring. The more convenient arylene diamines should exhibit a pKb at 25° C. of at least about 8.7. It is particularly convenient to use arylene diamines exhibiting a pKb at 25° C. of at least about 11.7. Representative examples of these preferred amines are 4,4'-methylene-bis(2 - chloroaniline), 4,4' - methylene-bis(2-carbomethoxy-aniline), 4,4'-diaminodiphenyldisulfide, and 4,4'-diaminodiphenylsulfone. Other useful arylene diamines are: 4,4'-methylene-bis(2-methylaniline), 4,4'-methylene-bis(2-methoxyaniline), 4,4'-methylene-bis(3-bromoaniline) and 4,4'-methylenedianiline. Mixtures of diamines may be used. Aliphatic diamines which may be used include 1,6-hexamethylenediamine, 1,2-propanediamine, ethylenediamine, cadaverine, putrescine, piperazine, and 2,5-dimethylpiperazine.

The organic polyols may be substituted for part or all of the diamine for reaction with the isocyanato-terminated organic liquid composition. The amount of polyol employed should be sufficient to provide about 1 alcoholic hydroxyl group for each free isocyanato group. In other words, a stoichiometric equivalent amount should be used. Representative glycols include ethylene glycol,
propylene glycol,
trimethylene glycol,
1,2-butylene glycol,
1,3-butanediol,
1,4-butanediol,
1,5-pentanediol,
1,2-hexylene glycol,
1,10-decanediol,
1,2-cyclohexanediol,
2-butene-1,4-diol,
3-cyclohexene-1,1-dimethanol,
4-methyl-3-cyclohexene-1,1-dimethanol,
3-methylene-1,5-pentanediol,
diethylene glycol,
(2-hydroxyethoxy)-1-propanol,
4-(2-hydroxyethoxy)-1-butanol,
5-(2-hydroxypropoxy)1-pentanol,
1-(2-hydroxymethoxy)-2-hexanol,
1-(2-hydroxypropoxy)-2-octanol,
3-allyloxy-1,5-pentanediol,
2-allyloxymethyl-2-methyl-1,3-propanediol,
[(4-pentyloxy)methyl]-1,3-propanediol,
3-(o-propenylphenoxy)1,2-propanediol,
thiodiglycol,
2,2'-[thiobis(ethyleneoxy)]diethanol,
polyethyleneneether glycol (molecular weight 200) and
2,2'-isopropylidenebis(p-phenyleneoxy)diethanol.

In addition, one may use such triols as
glycerol,
1,2,6-hexanetriol,
1,1,1-trimethylolpropane,
3-(2-hydroxyethoxy)-1,2-propanediol,
3-(2-hydroxypropoxy)-1,2-propanediol,
2,4-dimethyl-2-(2-hydroxyethoxy)methylpentanediol-1,5,
1,1,1-tris[(2-hydroxyethoxy)methyl]ethane,
1,1,1-tris[(2-hydroxypropoxy)methyl]propane,
triethanolamine and
triisopropanolamine.

Mixtures of two or more of the above polyols may be used if desired.

Other organic compositions (not self-curable) which may be used as organic liquids in the present process are the hydroxyl-terminated materials such as the hydroxyl-terminated polyhydrocarbons (U.S. Patent 2,877,212); hydroxyl-terminated polyformals (U.S. Patent 2,870,097); fatty acid triglycerides (U.S. Patents 2,833-730 and 2,787,601); hydroxyl-terminated polyesters (U.S. Patents 2,698,838, 2,921,915, 2,591,884, 2,866,762, 2,-850,476, 2,602,783, 2,729,618, 2,779,689, 2,811,493, and 2,621,166); hydroxymethyl-terminated perfluoromethylenes (U.S. Patents 2,911,390 and 2,902,473); polyalkyleneether glycols (U.S. Patent 2,808,391; British 733,624); polyalkylenearyleneether glycols (U.S. Patent 2,808,391); polyalkyleneether triols (U.S. Patent 2,866,774).

The froths obtained from these hydroxyl-terminated organic liquids may be cured by the addition of polyisocyanates. Representative polyisocyanates include toluene-2,4-diisocyanate,
1,6-hexamethylenediisocyanate,
1,4-tetramethylene-diisocyanate,
1,10-decamethylenediisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3-dimethyl-4,4'-diisocyanatodiphenylmethane,
2,6-dimethyl-4,4'-diisocyanatodiphenyl, 2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran, and
2,4,6-toluenetriisocyanate.

The cured, tack-free cellular materials which are obtained by the novel process of this invention may be employed in any of the fields where foams have been used. Thus, they are very useful for seat cushions, upholstery, crash-pads, insulation panels and the like.

The following examples will better illustrate the nature of the present invention; however, the invention is not intended to be limited to these examples. Parts are by weight unless otherwise indicated.

EXAMPLE 1

A. *Apparatus*

The mixing zone consisted of a vertical polymethylmethacrylate cylinder 30 inches high and 2 inches in diameter containing 13 100-mesh screens (having square openings wherein the sides were 149 microns in length) located at 2-inch intervals within it. The ratio of the distance between the screens to the total area of one surface side was $$\frac{2}{\pi(1)^2} = 0.637$$

The top of the cylinder was entirely open; the conical base terminated in an inlet port for gas and liquid. A side-arm ¾ inch in diameter for removing froth was attached just below the topmost screen.

B. *Preparation and Curing of the Expanded Froth*

One hundred grams of a polymeric triol having a molecular weight of 3000 (made by reacting 2908 parts of propylene oxide with 92 parts of glycerine), 11 grams of a toluene diisocyanate isomer mixture (80% 2,4-, 20% 2,6-), and 0.5 gram of a water-soluble organosilicone block polymer (made according to the procedure in Example I(a) of U.S. Patent 2,834,748), were stirred together at room temperautre. About 30 minutes later, the resulting mixture (Brookfield viscosity 330 centipoises at 25° C.) and a stream of air at 12 p.s.i., gauge, were simultaneously introduced (ratio of air to organic liquid 60 cu. ft./lb.) at the base of the cylinder described in Part A above at 25° C. A froth of air and liquid formed within the cylinder and emerged from the side-arm. After 0.5 gram of N,N,N',N'-tetramethyl-1,3-butanediamine, 1.0 gram of 4,4'-methylenebis(2-chloroaniline) and 10 drops of stannous octoate had been stirred into this froth, the mixture obtained was poured into a wax-lined container and transferred to a vacuum desiccator. Reduction of the pressure to 15 mm. Hg (absolute) caused about a 10-fold expansion of the froth to give a porous mass which was subsequently cured by placing the desiccator in a 121° C. oven for one hour. Finally, atmospheric pressure was restored, the desiccator was opened, and the tack-free resilient foam obtained was removed.

EXAMPLE 2

A. *Preparation of Polyurethane Polymer A*

Ten thousand grams of polypropyleneether glycol of number-average molecular weight 2000 and 40 grams of water were charged into a dry reactor which was continually protected by a nitrogen atmosphere. After the mixture had been stirred for 30 minutes at about 35–40° C., 1454 grams of an 80:20 mixture of toluene-2,4- and toluene-2,6-diisocyanate was introduced with strong agitation. Heat was evolved and the temperature rose to about 45–55° C. After about 30 minutes the temperature of the mass began to drop. External heat was then applied raising the temperature to 120° C. in about 40 minutes. After the mass had been agitated at 120° C. for 75 minutes, 2300 additional grams of the toluene diisocyanate isomer mixture was introduced. The mass was stirred 30 minutes more while being cooled to 40° C. Polymethane polymer A thus obtained had a free isocyanato content of about 9.5 percent and exhibited a Brookfield viscosity of 11000 c.p.s. at 30° C.

B. *Preparation and Curing of Expanded Froth*

One hundred grams of polyurethane polymer A containing 0.5 gram of polydimethylsiloxane (50 centistokes viscosity) was mixed at atmospheric pressure at 25° C. with a stream of air (ratio of air: organic liquid 60 cu. ft./lb.) according to the procedure of Example 1B in an apparatus as described in Example 1A. The froth obtained, which had very fine bubbles (average size 30 to 50 microns) was stirred with 0.5 gram of N,N,N',N'-tetramethyl-1,3-butanediamine, 1.0 gram of 4,4'-methylenebis(2-chloroaniline), and 0.2 gram of stannous octoate in a wax-lined container and transferred to vacuum desiccator. After the pressure had been reduced to 50 mm. Hg absolute the expanded froth was allowed to cure in place by transferring the desiccator to an oven at 120° C. for 3 hours. Finally, atmospheric pressure was restored, the desiccator was opened, and the container was stripped off. A tack-free resilient foam having a density of about 6 lb./cu. ft. was obtained.

EXAMPLE 3

A. *Apparatus*

A cylinder of polymethylmethacrylate 24 inches high was employed having a wall thickness of ¼ inch and an inner diameter of 2 inches. The base was fitted with a ¼-inch inner diameter glass T-joint for introduction of the gas and liquid streams. The top was fitted with a pair of flanges gasketed by an O-ring; a tube led from the upper flange to a pressure gauge and a safety vent. A ¾-inch inner diameter side-arm equipped with a valve was attached just below the lower flange. Nine 30-mesh screens (having square openings wherein the sides were 590 microns in length) were located within the column; the first was placed 3 inches above the T-joint; the next seven were spaced at 2-inch intervals (ratio distance between screen:area of a screen side=0.637); the last screen was positioned one inch above the eighth screen (ratio distance between screens:area of a screen side=0.319).

B. *Preparation of Expanded Froth*

A fluid composition was prepared as in Example 1B from a polymeric triol, toluene diisocyanate, and a water-soluble organosilicone block polymer. About one hour later, this composition was introduced into one arm of the T-joint of the apparatus described in part A above; an air stream entered the other arm of the T-joint (ratio of air to organic liquid=60 cu. ft./lb.). A pressure of 50 p.s.i. (gauge) was built up in the column. The expanded froth collected at atmospheric pressure from the side-arm had a density of 35.9 lb./cu. ft. and exhibited an average bubble size of 70 microns. When the column was operated at atmospheric pressure (0 p.s.i., gauge), the froth had a density of 48.2 lb./cu. ft. and exhibited an average bubble size of 800 microns; the fluid composition itself had a density of 62.4 lbs./cu. ft.

C. The expanded froths were cured by the procedure given in part B of Example 1 to give tack-free resilient foams.

EXAMPLE 4

A. *Apparatus*

A cylinder of copper 24 inches high was used having a wall thickness of ¼ inch and an inner diameter of 2 inches. The base was fitted with a ¼ inch inner diameter copper T-joint for introduction of the streams of air and liquid. The top was fitted with a pressure gauge. A ¾ inch inner diameter side-arm (equipped with a letdown valve) was attached 2 inches below the top. Nine 100-mesh screens (having square openings wherein the sides were 149 microns in length) were located within the column; the first was positioned 3 inches above the T-joint, the next seven were spaced at 2-inch intervals (ratio distance between screen:area of a screen side=0.637); the last screen was positioned one inch above the eighth screen (ratio distance between screen:area of a screen side=0.319).

B. *Preparation of Expanded Froth*

A fluid composition was prepared according to Example 1B from the polymeric triol, toluene diisocyanate isomer mixture and the water-soluble organosilicone block polymer. The fluid composition was placed in a 2-gallon feed tank. A ¼-inch inner diameter line from the base led to a Viking pump, capacity ⅔ gallon/min. driven by a ¾-horsepower A.C. motor through a variable speed drive. Beyond the pump was a 180 p.s.i. "pop" recycle valve which allowed the fluid composition to return to the feed tank via a ¼-inch inner diameter line. This composition was introduced at 30° C. into one arm of the T-joint of the apparatus described above in part A; an air stream entered the other arm of the T-joint (ratio of air:organic liquid=60 cu. ft./lb.). A pressure of 75 lb./sq. in. (gauge) was built up in the column. The expanded froth collected from the side-arm at atmospheric pressure (0 lb./sq. in., gauge) had a density of 28.1 lb./cu. ft.

C. *Curing the Expanded Froth to a Tack-Free Foam*

To 100 grams of the froth prepared in B above was then added, in turn, 1.5 grams of a toluene diisocyanate isomer mixture (80% 2,4-, 20% 2,6-), 0.18 gram of water, 0.3 gram of triethylenediamine, 0.3 gram of stannous octoate and 0.2 gram of dibutyl tin dilaurate. The mixture obtained was transferred to a 121° C. oven where further expansion occurred from carbon dioxide and heat. Finally, there was obtained a tack-free resilient foam having a density of 7.5 lb./cu. ft.

EXAMPLE 5

A. The equipment described in Example 4 was used except that the side-arm from the tower led to a receiver which was equipped with a vent, an air pressure regulator, and a letdown valve.

B. Polyurethane polymer B, an isocyanato-terminated polytetramethyleneether polyurethane, was made as follows: 348.4 parts (2 moles) of toluene-2,4-diisocyanate and 1000 parts (1 mole) of anhydrous polytetramethyleneether glycol (M.W. 1000) were agitated at 80° C. for 4 hours in a dry reaction vessel protected from atmospheric moisture. Polyurethane polymer B had a free isocyanato content of 6.5%, a Brookfield viscosity at 27° C. of about 8000 cps. and a number-average molecular weight of about 1348.

C. A dispersion was prepared by ball-milling 20 parts of 4,4'-methylenebis(2-chloroaniline) at about 25° C. with 20 parts of dioctyl phthalate and 0.4 part of an octyl phenyl monoether of polyethyleneether glycol (M.W. about 342).

D. 100 parts of polyurethane polymer B and 40.4 parts of the dispersion prepared in part C above were thoroughly blended at room temperature (25° C.) with the aid of a small propeller-type agitator. The charge (about 1.0 gallon) having a Brookfield viscosity of about 8000 centipoises at 25° C. was placed in the feed tank.

An air stream was fed to the base of the frothing column at the rate of about 1 cu. ft./sec. The air vent on the receiver was slowly closed until the pressure in the receiver and the column was 110 lb./sq. in. The letdown valve was closed. The Viking pump was started and its speed adjusted to feed the curable fluid composition at the rate of about 1 lb./min. with a discharge pressure of 180 lb./sq. in. through a valve into the base of the frothing tower at a point near the inlet line of the air stream (ratio air:organic liquid=60 cu. ft./lb.). Adjustment of the receiver vent line valve permitted control over the desired operating pressure in the frothing column. After the feed tank had become empty, the pump, the vent line from the receiver, and the air inlet lines were simultaneously shut off. The receiver was then closed off from the frothing column.

E. The pressure in the receiver was relieved by opening the vent. The froth contained in the receiver expanded. After the top of the receiver had been removed, the expanded froth was transferred to pans and oven-cured at 140° C. for one hour to give a tack-free elastic foam having a density of 15.5 lb./cu. ft.

F. The procedure of part E was changed in that the frothed composition was expanded as formed by allowing it to leave the system through the letdown valve at the same rate as curable fluid entered the base of the frothing column.

EXAMPLE 6

A. The process of Example 5 was changed by substituting a polymeric polyol from Table I below for the mixture of polyurethane polymer B and the dispersion of Example 5C. Prior to frothing, each 100 parts by weight of the polymeric polyol was mixed at about 25° C. with 1 part by weight of a water-soluble polydimethylsiloxane-polyalkyleneether block copolymer (made in accordance with Example I(*a*) of U.S. Patent 2,834,748). Each froth obtained was mixed at 25° C. with enough of an isomeric mixture of toluene diisocyanate (80% 2,4-, 20% 2,6-) to supply about one NCO group for every hydroxyl group in the froth. After each mixture had been oven-cured at 121° C. for about 3 hours, a tack-free cellular product was obtained.

*Table I*

| | Polymeric Polyols | M.W. | Brookfield Viscosity at 25° C. in Centipoise |
|---|---|---|---|
| 1 | Polypropyleneether glycol | 250 | 54 |
| 2 | do | 1,200 | 180 |
| 3 | do | 2,000 | 460 |
| 4 | do | 4,000 | 1,040 |
| 5 | Polypropyleneether triol (made by reacting 608 parts of 1,2-propylene oxide with 92 parts of glycerine). | 700 | 250 |
| 6 | Polypropyleneether triol (made by reacting 938 parts of 1,2-propylene oxide with 92 parts of glycerine). | 1,030 | 204 |
| 7 | Polypropyleneether triol (made by reacting 2,908 parts of 1,2-propylene oxide with 92 parts of glycerine). | 3,000 | |
| 8 | Polypropyleneether triol (made by reacting 2,366 parts of 1,2-propylene oxide with 234 parts of 1,2,6-hexanetriol). | 2,500 | 360 |
| 9 | Polypropyleneether triol (made by reacting 3,866 parts of 1,2-propylene oxide with 134 parts of 1,2,6-hexanetriol). | 4,000 | 644 |
| 10 | Polypropyleneether triol (made by reacting 5,866 parts of 1,2-propylene oxide with 134 parts of 1,2,6-hexanetriol). | 6,000 | 360 |
| 11 | Polypropyleneether triol (made by reacting 284 parts of 1,2-propylene oxide with 134 parts of trimethylolpropane). | 418 | 625 |
| 12 | Polypropyleneether triol (made by reacting 1,401 parts of 1,2-propylene oxide with 134 parts of trimethylolpropane). | 1,535 | 290 |
| 13 | Polypropyleneether triol (made by reacting 2,536 parts of 1,2-propylene oxide with 134 parts of trimethylolpropane). | 2,670 | 440 |
| 14 | Polypropyleneether triol (made by reacting 3,966 parts of 1,2-propylene oxide with 134 parts of trimethylolpropane). | 4,100 | 670 |

B. The general procedure of part A above was changed in that the mixing operation and frothing were carried out at 40° C. The polymeric polyols used were selected from the following:

Table II

| | | M.W. | Brookfield Viscosity at 30° C. in Centipoise |
|---|---|---|---|
| 1 | Polytetramethyleneether glycol | 1,000 | 360 |
| 2 | ----do---- | 3,000 | 6,500 |

As many widely different embodiments of this invention may be made without departing from the spirit and scope thereof, it is to be understood that this invention is not limited to the specific embodiments thereof except as defined in the appended claims.

What is claimed is:

1. Process for preparing a cured polyurethane cellular material which comprises passing an organic liquid and an inert gas together through a frothing zone consisting essentially of at least one perforated plate having a plurality of openings whose number-average size is such that the average minor axis of any opening is not less than 10 microns and the average major axis of any opening is not greater than 2000 microns, thereby causing at least a portion of said organic liquid and inert gas to form a froth consisting essentially of a plurality of bubbles having a number-average particle size ranging from about one to 2000 microns; reducing the pressure over said froth to less than the pressure at which it was formed, thereby causing expansion of said froth; and curing said expanded froth to yield a cured, tack-free polyurethane cellular material; said organic liquid being a precursor for said cured polyurethane cellular material and having a Brookfield viscosity at the tempertaure at which said froth is formed of from about 500 to 20,000 centipoise; the ratio in cu. ft./lb. of said inert gas to said organic liquid as they enter said frothing zone having a value ranging from about 30:1 to 120:1; with the proviso that when more than one perforated plate is employed, the number-average distance between the adjacent surfaces of said plates shall be such that the ratio of the distance between said adjacent surfaces to the total area of one of said surfaces have a value greater than about 0.014.

2. A process according to claim 1 wherein the organic liquid comprises an organic polyisocyanate and an organic compound having at least two atoms bearing active hydrogen atoms which are capable of reacting with isocyanato groups.

3. A process according to claim 1 wherein the organic liquid comprises an isocyanato-terminated polyurethane polymer.

4. A process according to claim 1 wherein the organic liquid comprises an organic polyol.

5. A process according to claim 3 wherein the isocyanato-terminated polyurethane polymer is obtained by reacting an organic diisocyanate with a polyalkyleneether glycol.

6. A process according to claim 5 wherein the organic diisocyanate is an isomeric mixture of toluene-2,4- and toluene-2,6-diisocyanate and the polyalkyleneether glycol is a polypropyleneether glycol.

7. A process according to claim 4 wherein the organic polyol is a polyalkyleneether glycol having a molecular weight of from about 250 to 4000.

8. A process according to claim 4 wherein the organic polyol is a polyalkyleneether triol having a molecular weight of from about 700 to 6000.

9. A process according to claim 1 wherein the organic liquid comprises an isocyanato-terminated polyalkyleneether polyurethane polymer and 4,4'-methylenebis(2-chloroaniline).

10. A process according to claim 1 wherein the inert gas is air.

11. A process according to claim 3 wherein the polyurethane polymer is an isocyanato-terminated polyester polyurethane.

12. A process according to claim 1 wherein the openings in the perforated plate are in the shape of squares the sides of which range from 59 to 600 microns in length.

13. A process according to claim 1 wherein the openings in the perforated plate are circular in shape with the circles having diameters ranging from 50 to 600 microns.

References Cited in the file of this patent

UNITED STATES PATENTS

| 2,307,082 | Te Grotenhuis | Jan. 5, 1943 |
| 2,763,475 | Dennis | Sept. 18, 1956 |
| 2,915,496 | Swart et al. | Dec. 1, 1959 |

FOREIGN PATENTS

| 1,159,607 | France | Feb. 17, 1958 |